3,268,811
TACHOMETER EMPLOYING A BLOCKING OSCILLATOR INCLUDING A SATURABLE CORE
Walter R. Jefferson, Jr., Mount Prospect, Ill., assignor to Stewart-Warner Corporation, Chicago, Ill., a corporation of Virginia
Continuation of abandoned application Ser. No. 169,827, Jan. 30, 1962. This application June 28, 1965, Ser. No. 467,655
5 Claims. (Cl. 324—70)

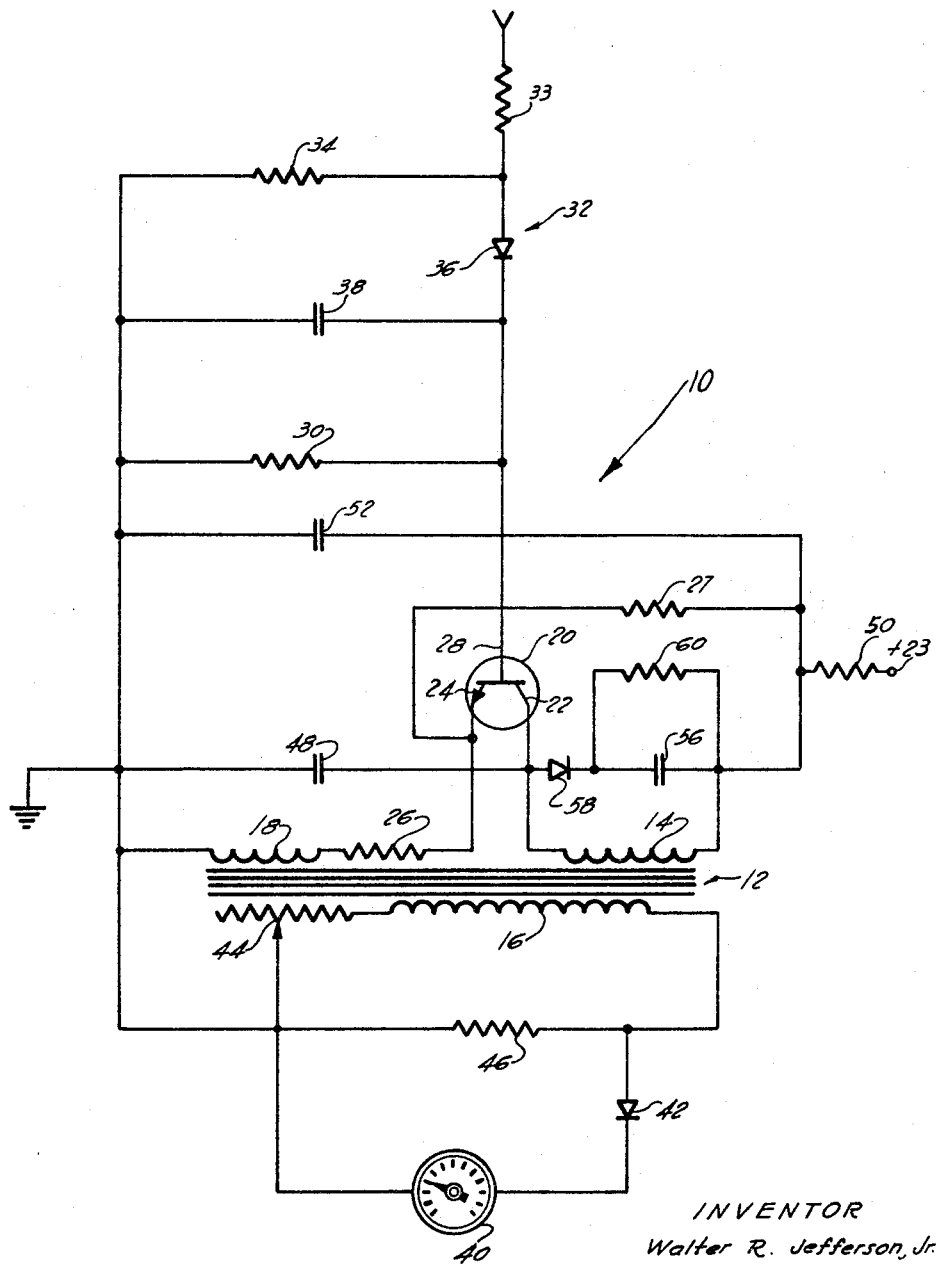

This is a continuation of my application Serial No. 169,827, filed January 30, 1962, now abandoned.

This invention relates to a circuit for determining the frequency rate of periodic pulses fed thereto and more particularly to a circuit including a novel blocking oscillator circuit which produces sufficient energy in its output to drive simple, relatively insensitive indicating means such as meters or the like. The invention is, therefore, particularly suitable for use as a sender for an electric tachometer to determine the operating speed of internal combustion engines.

There have been a great number of circuits adapted for energizing a tachometer responsive to the speed of the engine being tested. Most of these circuits operate responsive to the pulses provided in the ignition system which must necessarily be shaped and amplified to give an appropriate signal for energizing an electric meter responsive only to the frequency of the ignition pulses. Heretofore, the sender circuits were capable of producing only low power signals which required the use of expensive meters having very sensitive movements such as the D'Arsonval types. In the alternative, expensive amplifying means were required if cheaper meter means were to be used. Therefore, it is an object of this invention to provide a tachometer sender circuit, which is usable to drive a relatively insensitive meter movement from the ignition system of an internal combustion engine.

It is also an object of this invention to provide a tachometer sender circuit which has a high overall gain and does not require any further amplification of its signal output for driving a simple, relatively insensitive meter movement.

It is another object of this invention to provide a tachometer sender circuit which is relatively free from the effects of transient variations in source power and/or its own circuit elements.

It is another object of this invention to provide a novel blocking oscillator circuit which generates an almost pure square wave signal and whose output may be readily amplified to drive a load.

Other objects and advantages of this invention will become readily apparent upon a further reading of this specification especially when taken in view of the accompanying drawing, the figure of which is a schematic diagram of a circuit embodying the techniques of this invention as employed in a sender for a tachometer to indicate the running speed of an internal combustion engine.

Briefly, the circuit of this invention comprises a saturable transformer having a primary winding, a secondary winding, and an auxiliary winding with signal amplifying means having its output connected to the primary winding. The auxiliary winding of the saturable transformer is connected to the input of the amplifying means to provide positive feedback thereto and it is also included in a voltage divider network for providing cutoff bias to the amplifier. The magnetomotive force produced by the biasing current through the auxiliary winding, when the amplifier is cut off, is sufficient to maintain the transformer in a saturated condition. When a pulse is submitted to the input of the amplifier sufficient to overcome the cutoff bias, the amplifier drives the transformer into an oppositely saturated condition and back to the normally saturated condition with the auxiliary winding acting as a regenerative feedback. Means responsive to the average signal in the secondary winding of the transformer are connected thereto to indicate the frequency of the pulses applied to the circuit.

Referring now to the drawing, it may be seen that the sender circuit 10 comprises a saturable reactor 12 having a primary winding 14, a secondary winding 16 and an auxiliary winding 18. The transformer 12 is driven by a transistor 20 which has its collector 22 connected to one end of the primary winding 14, the other end of which is connected to a voltage source terminal 23 through resistor 50. The emitter 24 of the transistor 20 is connected through resistor 26 and the auxiliary winding 18 to ground and also through resistors 27 and 50 to the positive voltage source terminal 23. Base 28 of the transistor is also connected to ground through a resistance 30.

It will be noted that the auxiliary winding 18, resistor 26, resistor 27, and resistor 50 form a series circuit between the voltage source terminal 23 and ground so that the voltage drop across winding 18 and resistor 26 provides the bias between the base 28 and emitter 24 through the base resistor 30. The resistance values of winding 18 and resistors 26 and 27 are chosen such that the transistor 20 is normally cut off. Also, the current flowing through winding 18 to provide the cutoff bias also produces sufficient flux to saturate the core of the transformer 12 in a given sense.

Pulses from the ignition system of the engine are applied through an input circuit 32 to the base 28 of the transistor 20. The pulses from the ignition system contain some rather high voltage components which consist of both A.C. and D.C. signals. The input circuit 32, consisting of resistors 33 and 34, diode 36 and capacitor 38 reduces the voltage and rectifies and shapes the pulses therefrom so that the modified pulse will reliably trigger the transistor 20 only once each time an ignition pulse occurs.

When an ignition pulse occurs, the modified pulse temporarily applies a voltage across the emitter base junction that overcomes the cutoff bias so as to cause the base-emitter junction to conduct. The base-emitter current results in a much larger current flowing in the collector 22 and through the primary winding 14 of the transformer 12. The larger current also flows in the emitter circuit through winding 18 and resistor 26. Current flowing in the primary winding 14 produces a magnetomotive force that opposes the magnetomotive force produced by current flowing in the auxiliary winding 18. The net magnetomotive force is such that the transformer core is driven out of saturation and a change in the direction of the flux occurs. The change in magnetic flux induces a voltage in the auxiliary winding 18 that in turn further forward biases the base emitter junction. This causes more current to tend to flow in the collector circuit of the transistor. The winding 18 therefore provides a regenerative or positive feedback to drive the transistor into the saturation region. During transistor saturation, the transistor acts similar to a closed switch insofar as the collector emitter terminals are concerned. Current in the collector circuit is limited mainly by the inductive effect of primary winding 14 and increases until the transformer core is driven into the saturation region in the opposite sense. As the core is driven further into saturation the rate of change of flux decreases as well as the magnetomotive force resulting therefrom. The feedback voltage induced in auxiliary winding 18 decreases and the forward bias on the base emitter junction decreases. The result is a regenerative effect that eventually turns the transistor off. Transformer core flux begins to recede away from its oppositely saturated condition and is driven toward its original saturated condition by the magnetomotive force applied by auxiliary winding 18 due to the bias current flowing through resistors 27 and 26 and winding 18. During this part of the cycle when the core is rapidly approaching saturation in the original sense, a voltage is induced in the auxiliary winding that heavily reverse biases the base emitter junction. When the transformer is driven into the original saturation condition, induced voltages are no longer present. Transformer bias current flowing through the dividing network (resistors 50, 27, 26 and winding 18) applies a positive voltage to the emitter of the transistor. The base 28 is returned to ground through resistor 30. Thus the base emitter junction of transistor is again reverse biased to hold the transistor in the off state until another ignition pulse is received to trigger the cycle again.

The secondary winding 16 serves as the output for the one-shot multivibrator hereinbefore described. It drives an indicator meter 40 through a circuit including a rectifier 42 and a potentiometer 44 in series therewith. The rectifier 42 allows current to flow due to voltage induced in the secondary winding 16 as the transformer core is driven from its original saturated condition to the opposite saturated condition, but it prevents the current flow which would otherwise result as the bias current drives the core from the said opposite saturated condition to the original saturated condition. This is necessary to prevent the second induced pulse, which is of opposite polarity, from applying a reverse pulse to the indicating meter 40 and nullifying the effect of the first pulse. Powering the indicator with the pulse that occurs when the transistor is driving the transformer results in shorter time constants and allows operation at higher engine speeds.

The potentiometer 44 is a calibration control for the meter. By varying the resistance in the circuit by the potentiometer 44, the setting of the meter 40 may be made in accordance with pulses of known frequency being applied to the input of the circuit.

Each output pulse delivers a fixed quantity of electrical energy to the indicator. This results in an average electric current that varies directly with the frequency of the triggering signal. Thus, the indicator can be graduated to read engine speed or frequency of the triggering pulse.

A resistor 46 appears across the secondary winding 16 and potentiometer 44 to make the sender less susceptible to false triggering from transient sources. The resistor 46 has no noticeable effect during the transistor "on" portion of the cycle. During the transistor "off" period, however, and while the bias feedback winding is returning the core flux to the original saturated condition, the resistor 46 acts as a load and slows down the switching time. The resistor 46 reduces the maximum speed to which the circuit is responsive somewhat and may be eliminated if the transient sources are not too great.

Other measures have also been taken to reduce the effect of transients in the circuit. For example, capacitor 48 between the transistor collector 22 and ground and the series connected resistor 50 and capacitor 52 between the voltage source 24 and ground tend to absorb short duration pulses and prevent power supply transients, etc. from falsely triggering the circuit.

During the time the transformer 12 is switched from its oppositely saturated condition to its original saturated condition (as the transistor 20 turns off), transient voltages are induced in the primary winding 14 that could damage the transistor. An absorbing type of network comprising a capacitor 56, and a diode 58 is connected across the primary winding 14 to reduce the magnitude of the transient voltage. A resistor 60 is included to drain off the charge that builds up on capacitor 56 due to the transient voltage. Diode 58 prevents the capacitor 56 from loading the primary winding 14 and appreciably increasing circuit switching time and/or self-oscillation.

Voltage compensation may be achieved in the circuit by the use of a proper magnetic material for the transformer core which has a square hysteresis loop characteristic. The transformer core is driven from one fixed level of flux density to another. A change in supply voltage affects only the rate of change of flux. As the rate of change of flux varies, the time duration of the flux change also varies. When the instantaneous output pulse voltage is measured in small time increments and integrated over a complete cycle it is found that each output pulse has a substantially constant value expressed in volt seconds. As the output voltage pulse increases in magnitude due to increased supply voltage, the pulse duration time decreases and results in a constant volt-second output pulse that does not vary with supply voltage.

While there has been described in detail a preferred embodiment of the invention, it is readily recognized that many modifications may be made thereto while still remaining with in the scope of the invention. It is, therefore, intended that the invention be limited only by the scope of the appended claims.

What is claimed is:

1. A pulse rate indicating device comprising a saturable transformer having a primary winding, a secondary winding and an auxiliary winding, a transistor having its output connected to said primary winding, said auxiliary winding connected to the input of said transistor in positive feedback relationship therewith, means including said auxiliary winding for normally biasing said transitor to cutoff and normally maintaining said transformer in a saturated condition, means for applying each pulse to the input of said transistor to overcome said cutoff bias whereby said transistor drives said transformer to an oppositely saturated condition and said auxiliary winding drives said transformer back to said normally saturated condition, and means responsive to the signal generated in said secondary winding for indicating the rate of receipt of said pulses.

2. A circuit for driving a tachometer from an ignition coil pulse source comprising a junction transistor, a voltage source, a saturable core transformer having a primary winding series connected between said voltage source and the collector of said transistor, a secondary winding and an auxiliary winding on said transformer, a series connected voltage divider including said auxiliary winding connected between said voltage source and ground, means for connecting the base of said transistor to ground and the emitter to a voltage above ground in said voltage divider, the current flowing through said auxiliary winding normally maintaining said transformer core in a saturated condition, said auxiliary winding also wound in opposite phase relationship with respect to said primary winding to provide positive feedback to the input of said transistor, a pulse shaping circuit including a rectifier connected to the base of said transistor and connectable to said ignition coil pulse source for applying rectified peaked pulses to the base of said transistor to cause each said pulse to overcome the cutoff bias whereby said transistor will drive said transformer to an oppositely saturated condition and the positive feedback of said auxiliary winding will cut off said transistor to cause said transformer to return to its normally saturated condition, and means connecting said tachometer across said secondary for indicating the rate of receipt of pulse signals generated therein.

3. The circuit of claim 2 wherein said tachometer connecting means includes a resistor directly connected across said secondary winding.

4. A pulse rate indicating device comprising a transistor, a voltage source, a saturable core transformer having a primary winding series connected between said voltage source and the collector of said transistor, a secondary winding and an auxiliary winding on said transformer, a series connected voltage divider including said auxiliary winding connected between said voltage source and ground, the current flowing through said auxiliary winding normally maintaining said transformer core in a saturated condition, said auxiliary winding also being series connected between the transistor emitter and ground and wound in opposite phase relationship with respect to said primary winding to provide positive feedback to the input of said transistor, means for applying rectified peaked pulses to the base of said transistor whereby said transistor will drive said transformer to an oppositely saturated condition and said positive feedback will cut off said transistor to cause said transformer to return to its normally saturated condition, and means responsive to the signal generated in said secondary for indicating the frequency of said pulses.

5. A pulse rate indicating device comprising a saturable transformer having a primary winding, a secondary winding, and an auxiliary winding, a normally cut off transistor having its output connected to drive said primary winding, said auxiliary winding connected to the input of said amplifying means in positive feedback relationship therewith, means including at least a portion of said auxiliary winding for normally maintaining said transformer in a saturated condition, means for applying each pulse to the input of said transistor to drive said transistor into conduction whereby said primary winding drives said transformer to an oppositely saturated condition and said auxiliary winding drives said transformer back to said normally saturated condition, and means connected to said secondary winding for indicating the rate of receipt of said pulses.

References Cited by the Examiner
UNITED STATES PATENTS

| | | | |
|---|---|---|---|
| 2,887,654 | 5/1959 | Strassman | 324—78 |
| 2,900,508 | 8/1959 | Tillman | 331—112 |
| 2,927,268 | 3/1960 | Haggai | 324—70 |
| 2,995,706 | 9/1961 | Clarridge | 324—70 |
| 3,005,158 | 10/1961 | Spinrad | 331—148 |
| 3,010,032 | 11/1961 | Carney | 331—112 |

WALTER L. CARLSON, *Primary Examiner.*

M. J. LYNCH, *Assistant Examiner.*